(12) United States Patent
Bathel et al.

(10) Patent No.: US 11,650,151 B2
(45) Date of Patent: *May 16, 2023

(54) COMPACT, SELF-ALIGNED PROJECTION FOCUSING SCHLIEREN METHOD AND SYSTEM

(71) Applicant: UNITED STATES OF AMERICA AS REPRESENTED BY THE ADMINISTRATOR OF NASA, Washington, DC (US)

(72) Inventors: Brett F. Bathel, Yorktown, VA (US); Joshua M. Weisberger, Newport News, VA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 19 days.

This patent is subject to a terminal disclaimer.

(21) Appl. No.: 17/490,521

(22) Filed: Sep. 30, 2021

(65) Prior Publication Data
US 2022/0113251 A1    Apr. 14, 2022

Related U.S. Application Data

(60) Provisional application No. 63/089,217, filed on Oct. 8, 2020.

(51) Int. Cl.
*G01N 21/45* (2006.01)
*G02B 5/04* (2006.01)
(Continued)

(52) U.S. Cl.
CPC ....... *G01N 21/455* (2013.01); *G01B 11/2513* (2013.01); *G02B 5/04* (2013.01); *G02B 27/286* (2013.01)

(58) Field of Classification Search
CPC .... G01N 21/455; G01B 11/2513; G02B 5/04; G02B 27/286
See application file for complete search history.

(56) References Cited

U.S. PATENT DOCUMENTS 4,060,316 A * 11/1977 Pollack .................. G02F 1/135
353/121
5,515,158 A *  5/1996 Heineck ............... G01N 21/455
356/129

(Continued)

OTHER PUBLICATIONS

Benjamin Buckner et al., Digital focusing schlieren imaging, Aug. 2015, SPIE Applied Advanced Optical Metrology Solutions, pp. 1-8, vol. 9576 (Year: 2015).*

(Continued)

*Primary Examiner* — Michael P LaPage
(74) *Attorney, Agent, or Firm* — Shawn P. Gorman; Robin W. Edwards; Trenton J. Roche

(57) ABSTRACT

Light is projected through a grid (e.g., a Ronchi ruling) and onto a background, where it forms an image of the ruling. The light from this projected image is then reflected back onto the same grid, with a polarizing refractor (e.g., a Rochon polarizing prism) imparting a small offset between the projected and reflected light, and then on to an imaging camera. Thus, a separate source and cutoff grid is not needed, resulting in a focusing schlieren system that is compact and easy to construct and align. In some embodiments, translation of the polarizing refractor along the instrument axis provides a sensitivity adjustment of the resulting schlieren images. Manipulation of the polarization state of the light through the system allows the projected and reflected light to be coincident, maintaining a small footprint for the system, which can be mounted to the front of the imaging camera.

20 Claims, 8 Drawing Sheets

(51) Int. Cl.
*G01B 11/25* (2006.01)
*G02B 27/28* (2006.01)

(56) References Cited

U.S. PATENT DOCUMENTS

| | | | | |
|---|---|---|---|---|
| 6,181,416 | B1* | 1/2001 | Falk | G01N 21/455 324/762.01 |
| 11,539,937 | B2* | 12/2022 | Fisker | G01B 11/2518 |
| 2005/0036153 | A1* | 2/2005 | Joannes | G02B 27/54 356/518 |
| 2014/0267781 | A1* | 9/2014 | Buckner | G01N 21/455 348/241 |
| 2018/0188167 | A1* | 7/2018 | Schoegl | H04N 17/02 |
| 2019/0219501 | A1* | 7/2019 | Ohno | G01N 21/455 |
| 2022/0187161 | A1* | 6/2022 | Antoine | G01N 21/455 |

OTHER PUBLICATIONS

R. E. Peale et al., Zebra schlieren optics for leak detection, Aug. 1, 1996, Applied Optics, vol. 33, No. 22, pp. 4518-4521 (Year: 1996).*

L.M. Weinstein, "Review and update of lens and grid schlieren and motion camera schlieren," The European Physical Journal Special Topics, 2010, pp. 65-95, 2010, vol. 182, No. 1.

Biss et al., Differential schlieren-interferometry with a simple adjustable Wollaston-like prism, Applied Optics, 2008, pp. 328-335, vol. 47, No. 3.

L.M. Weinstein, "Large-field high-brightness focusing schlieren system," AIAA Journal, 1993, pp. 1250-1255, vol. 31.

Fagan et al., "Application of a novel projection focusing schlieren system in NASA test facilities," 30th AIAA Aerodynamic Measurement Technology and Ground Testing Conference, 2014, pp. 1-14, Atlanta, GA.

Buckner et al., "Digital focusing schlieren imaging," Applied Advanced Optical Metrology Solutions, Proceedings of SPIE, 2015, pp. 95760C-1-95760C-8, vol. 9576, San Diego CA.

L'Esperance et al., "Focusing schlieren systems using digitally projected grids," Proceedings of SPIE, 2017, pp. 103730R-1-103730R-10, vol. 10373, San Diego CA.

Buckner et al., "Schlieren unwrapped: distortion correction in digital focusing schlieren," Proceedings of SPIE, 2019, pp. 111020R-1-1111020R-9, vol. 11102, San Diego CA.

Small et al., "Single Beam Schlieren Interferometer Using a Wollaston Prism," Applied Optics, 1972 11(4), pp. 858-862, vol. 11 No. 4.

* cited by examiner

COMPACT, SELF-ALIGNED PROJECTION FOCUSING SCHLIEREN METHOD AND SYSTEM

CROSS-REFERENCE TO RELATED PATENT APPLICATION(S)

This patent application claims the benefit of and priority to U.S. Provisional Patent Application Ser. No. 63/089,217, filed on Oct. 8, 2020, the contents of which are hereby incorporated by reference in their entirety for any and all non-limiting purposes. The present application is also related to co-pending U.S. patent application Ser. No. 17/490,612 filed concurrently on Sep. 30, 2021, the contents of which are hereby incorporated by reference in their entirety for any and all non-limiting purposes.

STATEMENT REGARDING FEDERALLY SPONSORED RESEARCH OR DEVELOPMENT

The invention described herein was made by employees of the United States Government and may be manufactured and used by or for the Government of the United States of America for governmental purposes without the payment of any royalties thereon or therefore.

BACKGROUND

Schlieren imaging is routinely used in wind tunnel experiments as a flow visualization tool that is sensitive to density gradients. A typical conventional schlieren system collimates light from a small, point-like source using a field focusing optic (either a high-quality parabolic mirror or a lens) and passes this collimated light through a flow-field of interest. A second field focusing optic placed on the opposite side of the flow-field images the original light source at a point. A knife-edge located at this point is placed such that it blocks a portion of the image of the light source, with the remainder of the light passing through to a camera sensor. Any gradient in density that exists between the two field optics results in a refractive index gradient that diverts some of the rays of light in the light column. These diverted rays ultimately either terminate on, or pass by, the knife-edge. The resulting image captured by the camera sensor then consists of light and dark regions that correspond to structures of varying density in the flow-field.

While the qualitative images schlieren provides are useful for flow characterization, they represent the entire path-integrated density gradient field that exists between the two field focusing optics. Thus, every density gradient feature present in the field-of-view is captured in the resulting image, including features that are not pertinent to the flow of interest. Examples include non-relevant flow features, wind tunnel window scratches or chips, wind tunnel plenum or HVAC thermals, and wind tunnel wall boundary layer turbulent structures. Another drawback of the conventional schlieren visualization technique is its limited field-of-view, which is bound by the clear aperture/diameter of the field focusing optics.

The focusing schlieren technique was developed to address the limiting characteristics of the conventional schlieren system; it can significantly reduce the influence of non-pertinent flow features and can provide larger fields-of-view. Typical focusing schlieren systems use a source grid placed on one side of the density object, which is then imaged with a lens onto a matching cutoff grid on the other side of the density object. Source grids usually consist of either a one-dimensional pattern of equally-spaced parallel line pairs or a two-dimensional regular pattern or shape. The cutoff grid must consist of a scaled duplicate of the source grid and can be challenging to create. By adjusting the offset of the cutoff grid relative to the image of the source grid, the sensitivity of the instrument to density gradients present between the source grid and imaging lens can be tuned (similar to adjusting the knife-edge insertion in a conventional system). For this type of setup, the numerous high-intensity/bright regions of the source grid effectively serve as the light sources for a number of conventional schlieren systems whose paths all intersect a common region that contains the flow feature of interest. This method of operation, in effect, defocuses the contribution of features that occur away from this common region in the final image.

The most common design is the modern large-field focusing schlieren system, which includes a light source that back-illuminates the source grid, with a Fresnel lens placed between the two in order to better direct light into the camera lens and improve brightness. The source grid is imaged onto the cutoff grid with a field lens, and the resulting focused schlieren image captured at the image plane by a camera. Placement of the source and cutoff grids relative to the field lens are readily determined using the thin lens equation, as is the placement of the schlieren object and image plane.

Another design is the retroreflective focusing schlieren system. This system includes an alternative source grid consisting of patterned retroreflective material, with illumination provided by coupling light onto the optical axis via a beam-splitting plate, and with the resulting image of the source grid incident on a matched cutoff grid. This system is useful when cross-tunnel optical access is not available, and when larger fields-of-view are required than provided by a Fresnel lens.

In another retroreflective system, the source grid is instead projected onto the screen and imaged onto a separate matched cutoff grid. And newer systems include a digital projection system used to project an image of a digital source grid onto a screen and include recent advancements in digital display technology (e.g., backlit and self-illuminating LCD and LED monitors) that enable the source grid to be tailored to the cutoff grid.

In all these focusing schlieren systems, a separate source and cutoff grid are required, resulting in major limitations. First, it is difficult to create or obtain a cutoff grid that is well-matched and properly scaled to the imaged source grid. Second, nearly perfect alignment between the cutoff grid and the imaged source grid is required. Film-based cutoff grids are developed from the negative of the source grid, but must then be installed in the system and meticulously aligned to the image of the source grid. Optical aberrations in the imaging optics can degrade the quality of the images since the film-based cutoff grid would no longer be an exact match of the imaged source grid. To avoid this degradation, the film would need to be developed in the exact setup of the installed system. Digital display methods can alleviate some of the difficulty in obtaining precise alignment between the source and cutoff grids, but they are restricted to lower-speed flows/fluctuations as light from the output of commercially-available digital displays is limited, and they still require a computer to match the displayed source grid to a physical cutoff grid. Transparent digital LCD displays with pulsed laser back-illumination do allow for high-speed measurements, although this (along with conventional digital displays) requires the use of bulky display equipment that may not be conducive to tests in space-restricted environments (e.g., wind tunnels). The colinear illumination projection systems also present significant challenges when used near a window, as back-reflections can cause intense hot spots to appear that adversely affect system performance. What is needed, therefore, are improved systems and methods that reduce or eliminate one or more drawbacks associated with the prior-art systems.

BRIEF SUMMARY

Aspects of the present invention relates to schlieren methods and systems for imaging density gradients, such as for example in wind tunnels. Light may be projected through a grid ruling (e.g., a Ronchi ruling) and onto a background (e.g., a retroreflective background), where it forms an image of the grid ruling. The light from this projected image may then reflected back onto the same grid ruling, with a polarizing refractor that refracts in only one direction (e.g., a Rochon polarizing prism) to impart a small offset between the projected and reflected light, and then on to an imaging camera. In this way, a separate source and cutoff grid is not needed, resulting in a schlieren system that is compact and easy to construct and align.

In some embodiments, translation of the polarizing refractor along the instrument axis provides a sensitivity adjustment of the resulting schlieren images. Manipulation of the polarization state of the light through the system allows the projected and reflected light to be coincident, maintaining a small footprint for the system, which can be mounted to the front of the imaging camera.

Example methods of schlieren imaging a density object include: projecting light rays with a first linear polarity along an optical axis in a projected direction; filtering the first linear polarity light rays through a grid a first time in the projected direction; passing the filtered light rays through the density object a first time in the projected direction; reflecting the filtered light rays back along the optical axis in a reflected direction opposite the projected direction; passing the reflected light rays through the density object a second time in the reflected direction; converting the reflected light rays from the first linear polarity to a second linear polarity that is offset by 90 degrees from the first linear polarity; filtering the 90-degree offset liner polarity light rays through the grid a second time in the reflected direction; and imaging the twice-filtered light rays. When the light rays with the first linear polarity are filtered through the grid the first time, the grid functions as a source grid, and when the light rays with the second 90-degree offset linear polarity are filtered through the grid the second time, the grid functions as a cutoff grid. In this way, filtering the light rays through the same grid twice results in self-alignment without any multi-grid alignment step.

The light rays can be projected from a light source and linearly polarized by a linear polarizing component. The light source can project the light rays transverse to the optical axis, with a beam splitter on the optical axis redirecting the light rays onto the optical axis. The light rays can be filtered both times by passing them through a Ronchi ruling grid, and they can be reflected by a retroreflective background.

In some embodiments, the reflected light rays are converted from the first linear polarity to the second 90-degree offset linear polarity by: converting the light rays from the first linear polarity to a first circular polarity; converting the light rays from the first circular polarity to a second circular polarity with a reverse angular direction from the first circular polarity; and converting the light rays from the second circular polarity to the second 90-degree offset linear polarity. For example, the light rays can be converted from the first linear polarity to the first circular polarity, and from the second reverse-direction circular polarity to the second 90-degree offset linear polarity, by passing the light rays through a quarter-wave plate optic or film on the optical axis. The light rays can be converted from the first linear polarity to the first circular polarity after being filtered by the grid the first time and before being reflected back, and the light rays can be converted from the second reverse-direction circular polarity to the second 90-degree offset linear polarity after being reflected back and before being filtered by the grid the second time. Also, the light rays can be converted from the first circular polarity to the second reverse-direction circular polarity by being reflected off a retroreflective background.

Some embodiments additionally include refracting the reflected light rays by an offset amount after converting the reflected light rays to the second 90-degree offset linear polarity and before filtering the 90-degree offset liner polarity light rays through the grid the second time. this can be done for example by a polarizing prism on the optical axis.

Example systems for schlieren imaging a density object include: a light source that projects light rays with a first linear polarity (a linear polarizing component that linearly polarizes the light rays to have a first linear polarity can be a component of the light source or a separate component); a grid that filters the light rays and is positioned on an optical axis; a background that reflects the light rays and is positioned on the optical axis; one or more optical elements (positioned on the optical axis between the grid and the background) that convert the light rays from the first linear polarity to a second linear polarity that is offset by 90 degrees from the first linear polarity; and a camera that images the light rays and is positioned on the optical axis. In use, the light rays are projected along the optical axis in a projected direction, filtered through the grid a first time, passed through the density object a first time, reflected off the background back along the optical axis in a reflected direction opposite the projected direction, passed through the density object a second time, filtered through the grid a second time, and incident on the camera. Furthermore, in use the one or more linear polarity 90-degree offsetting optical elements convert the light rays from the first linear polarity to the second 90-degree offset linear polarity after the light rays are filtered through the grid the first time and before the light rays are filtered through the grid the second time so that the grid functions as a source grid and as a cutoff grid.

The light source can project the light rays transverse to the optical axis, and a beam splitter can be included that is positioned on the optical axis and that redirects the light rays onto the optical axis. The grid can be a Ronchi ruling grid. And the background can be a retroreflective background.

In some embodiments, the one or more linear polarity 90-degree offsetting optical elements include a quarter-wave plate optic or film that is positioned between the grid and the background, that converts the light rays from the first linear polarity to the first circular polarity in the projected direction, and that converts the light rays from the second circular polarity to the second 90-degree offset linear polarity in the reflected direction. These components can further include a retroreflective surface of the background that converts the light rays from the first circular polarity to the second reverse-direction circular polarity.

Some embodiments additionally include a polarizing refractor that is positioned on the optical axis between the grid and the one or more linear polarity 90-degree offsetting optical elements, that transmits the linear polarity light rays through without refraction in the projected direction, and that that transmits the 90-degree offset linear polarity light rays through with an offset amount of refraction in the projected direction. For example, the polarizing refractor can be a polarizing prism (e.g., a Rochon prism, a Wollaston prism, a Sénarmont prism, or a parallel beam-splitting prism) or a film or sheet of magnesium fluoride.

Example embodiments include small-scale and large-scale systems, for example with fields-of-view ranging from about 1 cm$^2$ to about 500 mm$^2$. Other embodiments have other-sized fields-of-view.

These and other features, advantages, and objects of the present invention will be further understood and appreciated by those skilled in the art by reference to the following specification, claims, and appended drawings.

DETAILED DESCRIPTION OF THE INVENTION

Figure 1:
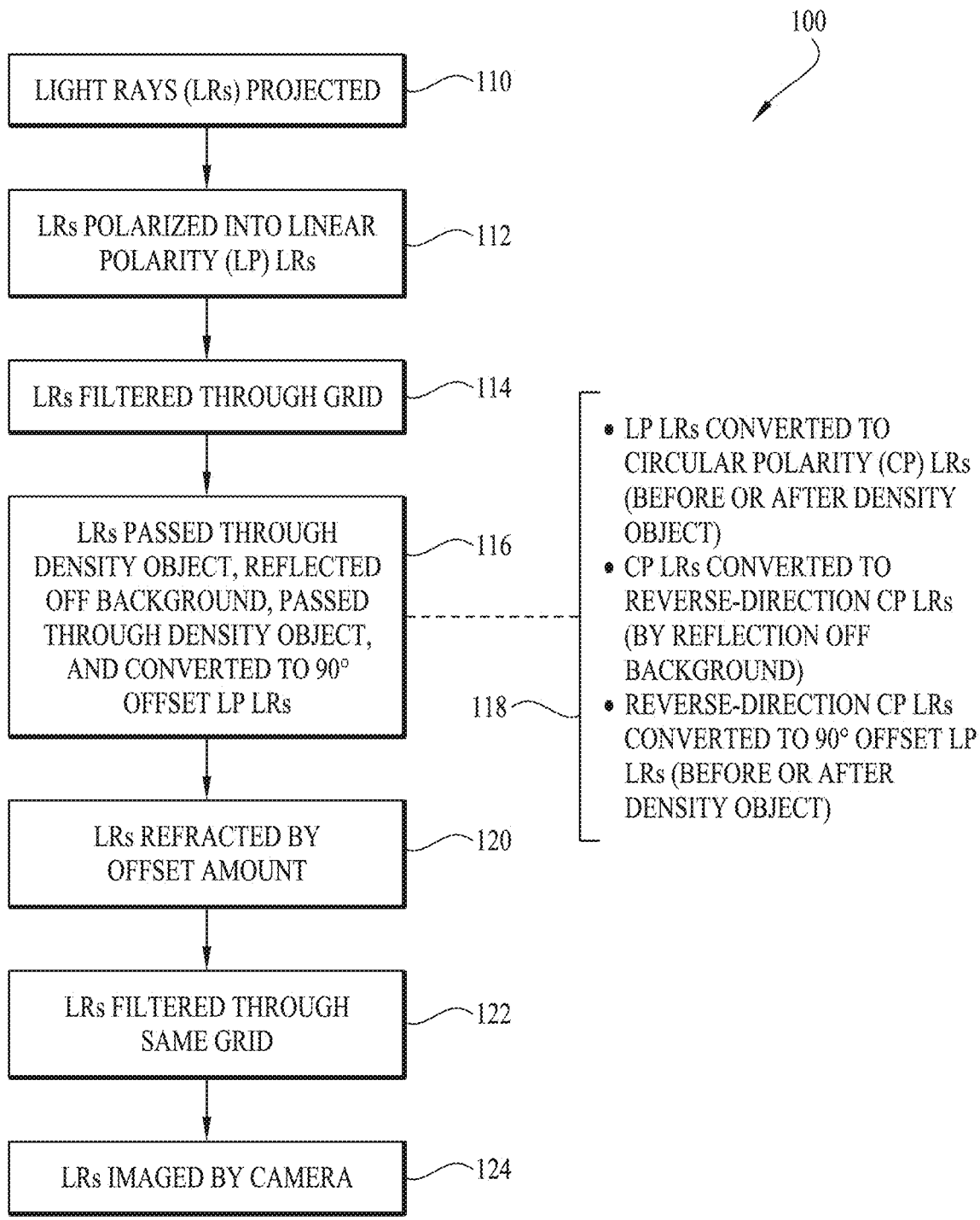
FIG. 1 is a flow diagram of a self-aligned focusing schlieren method according to a first example embodiment.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Example Schlieren Flowchart 100

FIG. 1 shows a self-aligned focusing schlieren flowchart 100 according to a first example embodiment. The self-aligned schlieren flowchart 100 can be performed using self-aligned schlieren systems including those of the example embodiments described below and adapted embodiments as understood by persons of ordinary skill in the art.

The schlieren flowchart 100 includes projecting light rays at 110, for example, but not limited to, from a light source of the type commonly used in schlieren imaging, such as a laser or LED. The light source can project light that is unpolarized, randomly polarized, or polarized.

Optionally, the light can be diffused, for example using a diffusing optic such as a condenser-diffuser lens (as in embodiments described below), so that the light source itself is not imaged and so the light is spread and loosely focused/collimated to improve the brightness of the resulting schlieren image. The diffuser lens can be of a conventional type, for example with one face effectively "sanded" to provide a diffuse output of the light. Optionally, a normal optical lens, or no lens, can be used.

At block 112, the light rays are polarized into a linear polarity state, for example by a linear polarizing component. The linear polarity state can be for example vertical linear polarity (as in embodiments described below) or horizontal linear polarity. The polarizing component can be for example a linear polarizer, a polarizing beam splitter, both a linear polarizer and a polarizing beam-splitter (as in embodiments described below), and/or other linear polarizing components. A polarizing beam-splitter can be oriented for example to reflect vertically polarized light onto the optical axis and transmit through horizontally polarized light, thereby directing only the vertically polarized light onto the optical axis for use in the schlieren flowchart 100. If unpolarized or circularly polarized light is incident on the polarizing beam-splitter, it will transmit 50 percent and reflect 50 percent. The reflected light will always be linearly vertically polarized and the transmitted light will always be linearly horizontally polarized. Because polarizing beam-splitters typically have a lower extinction ratio than linear polarizers, one or more linear polarizers can be used to increase the extinction ratio of the light. The linear polarizers can be optics (higher quality, higher cost) or film (lower quality, lower cost). Typically, a first linear polarizer is positioned between the light source and the beam-splitter for the projected light, and a second linear polarizer is positioned between the beam-splitter and the imaging device (described below) for the reflected light to further improve image contrast. In some embodiments, a non-polarizing beam-splitter is used, provided that both linear polarizers are used. The inclusion of the beam-splitter enables the schlieren flowchart 100 to be performed using a projection schlieren system with the light source transverse to the optical axis of the schlieren system implementing the schlieren flowchart 100.

In embodiments in which the light source emits light that is not linearly polarized, a linear polarizing component is included as a component of the light source or a separate component (e.g., as described herein). In such embodiments, the term "light source assembly" means the light source and an integral or separate linear polarizing component. In embodiments in which the light source produces linearly polarized light suitable for use in the schlieren flowchart 100 without enhancement, a linear polarizing component is not needed and thus need not be included. In such embodiments, the term "light source assembly" means the light source without an integral or separate linear polarizing component. Accordingly, the light projecting step 110 and the linear polarizing block 112 can be considered to form one single step in the schlieren flowchart 100.

Next at block 114, the light rays are then spatially filtered by a grid element, for example a Ronchi ruling (as in embodiments described below), with the light rays passing through forming a grid image. A Ronchi ruling is a optic such as a transparent piece of substrate material (e.g., a glass slide) with a pattern of opaque lines (e.g., chrome) printed/deposited on one of its surfaces. Because of the self-aligning feature (described below), the light can be filtered using other grid elements and/or grid elements including any regular or irregular design or pattern. The grid is positioned along the optical axis of schlieren system implementing the schlieren flowchart 100, with the lights rays passing through it twice (as projected and reflected lights rays, as described below).

A simple Ronchi ruling includes a set of uniform/repeating one-dimensional lines with regular spacing, which in use results in sensitivity to density (index of refraction) gradients in the direction perpendicular to the lines. This Ronchi ruling grid can be rotated to any other orientation to provide sensitivity in any other orientation. Note that if the Ronchi ruling grid is rotated, and if a polarizing prism (described below) is used, then the polarizing prism must also be rotated so that it always offsets the incoming lines perpendicular to the lines themselves. Another Ronchi ruling includes two sets of orthogonal intersecting lines forming an opaque grid defining a regular pattern of transparent squares, which in use results in sensitivity to density in two directions simultaneously. As such, the term "grid" includes not just patterns that are literally orthogonal grids. Note that if a polarizing prism (described below) is used, and if it is oriented 45 degrees from both line orientations, then in use sensitivity is provided to two orthogonal directions of density gradients at the same time.

Typically, the light rays are focused, for example using an optic such as a field lens with a positive focal length. The focusing lens can be any focusing optic, such as a camera lens (a single lens or a zoom lens). The focusing lens is positioned along the optical axis of schlieren system implementing the schlieren flowchart 100, with the light rays passing through it twice (as projected and reflected lights rays, as described below).

Next at block 116, the light rays are passed through a density object, reflected off a retroreflective background, passed back through the density object, and converted (i.e., altered) to a 90-degree offset linear polarity state. By passing the light rays through the density object twice, the resulting imaging sensitivity is increased. The conversion of the linear (e.g., vertical) polarity light rays into the 90-degree offset linear (e.g., horizontal) polarity light rays can be performed at any point in this step, including at or over multiple points in this step, for example as described below, so this process is not limited to the sequence described.

The density object is anything that creates a density gradient (i.e., an index of refraction gradient) in the field or zone of interest, for example the interior space of a wind tunnel (e.g., with or without windows) or an open space. As such, a density object as used herein includes solid objects (e.g., lenses) and/or fluids in the field of interest.

The retroreflective background can be any material that reflects the incoming "projected" light back along the same path as "reflected" light. Example retroreflective backgrounds that can be used include retroreflective sheeting (e.g., 3M SCOTCHLITE 7610, commercially available from 3M Company, St. Paul, Minn.) (as in embodiments described below) and retroreflective paint.

An example of the conversion of the light rays from a linear polarity to a 90-degree offset linear polarity is detailed at block 118. First, the linear polarity light rays are converted to circular polarity light rays, then the circular polarity light rays are converted to reverse direction circular polarity light rays, then the reverse direction circular polarity light rays are converted to the 90-degree offset linear polarity light rays. For example, vertically linear polarity light rays can be converted to right circular polarity light rays, then the right circular polarity light rays are converted to left circular polarity light rays, then the left circular polarity light rays are converted to horizontal linear polarity light rays (as in embodiments described below).

The circular polarity light rays are converted to the reverse direction circular polarity light rays by being reflected off the retroreflective background (as in embodiments described below). In particular, upon reflection off the retroreflective background, the circular polarization will change handedness (but when linear polarization is reflected, it will remain the same linear polarization). Alternatively, the circular polarity light rays can be converted to the reverse direction circular polarity light rays by another set of optics or materials, before or after being reflected off the retroreflective background.

The linear polarity light rays can be converted to circular polarity light rays, and the reverse direction circular polarity light rays can be converted to the 90-degree offset linear polarity light rays, by passing the lights rays through the same optical component twice (once in each of the projected and reflected directions). This is typically done by using a optic (higher quality, higher cost) or a film (lower quality, lower cost) that is positioned between the retroreflective background and a polarizing refractor (e.g., a polarizing prism, as described herein) (and thus between the retroreflective background and the grid in embodiments without a polarizing refractor).

For example, this can be done by the light rays being passed through a quarter-wave plate (QWP) optic (as in embodiments described herein) with its fast axis oriented at 45 degrees relative to the axis of the linear polarization so that it converts vertical linear polarization to right circular polarization (and vice versa) and converts horizontal linear polarization to left circular polarization (and vice versa). Optionally, if the QWP is rotated to −45 degrees (or 135 degrees, depending on where the angle is measured from), then the vertical linear will be converted to left circular and the horizontal linear to right circular. The quarter-wave plate optic retards one component of the light's polarization by one-quarter wavelength so that the output polarization is circular. The quarter-wave plate optic can be positioned between the polarizing refractor and the field lens, between the field lens and the density object, or between the density object and the retroreflective background. The quarter-wave plate optic can be positioned at a different orientation, but the resulting images produced by the schlieren flowchart 100 will be of a lower quality (because it will convert to and from elliptical polarity, instead of circular polarity).

In another example, this is done by the light rays being passed through a QWP film that converts light rays between linear and circular polarity. The film can be positioned between the polarizing refractor and the field lens, between the field lens and the density object, or between the density object and the retroreflective background. Alternatively, the QWP film can be positioned on or integrated into the retroreflective surface of the retroreflective background, for example as a coating, other treatment, or integral material component.

In other embodiments, another optical component can be used that converts light rays between linear and circular polarity to provide the functionality described herein. As such, the schlieren flowchart 100, and schlieren systems implementing it, are not limited to only the use of linear/circular polarity conversion optical components that are QWP optics and films.

Referring back to block 116, in other embodiments, the light rays are converted directly from a linear polarity state to a 90-degree offset linear polarity state without being converted to the circular and reverse-direction circular polarities states. For example, the retroreflective background can be selected with the property of effectively rotating the linear polarization of the light rays by 90 degrees upon reflection off the retroreflective background (as in embodiments described below). That is, upon reflection of the light rays, vertical linear polarity converts directly to horizontal linear polarity, and vice versa. In such embodiments, the retroreflective background functions as if a retarder is incorporated in the material of the retroreflective background, and so there is no need for a quarter-wave plate, a film, or another optic. Example non-limiting materials that can be used for the retroreflective background that provide this linear polarity 90-degree rotation include GAFFER POWER vinyl tape (commercially available from Gaffer Power, Inc., St. Petersburg, Fla.) and HILLMAN prismatic tape (commercially available from The Hillman Group, Inc., Cincinnati, Ohio).

Next at block 120, the light rays are refracted by an offset amount from the optical axis using a one-directional polarizing refractor. The polarizing refractor is positioned along the optical axis between the grid and the density object, with the light rays passing through it before and after being reflected by the retroreflective background (i.e., as projected and reflected light rays). The polarizing refractor is one-directional in that it is refracting in only one direction and only for one linear polarity state, that is, in a first direction one type of linear polarized light (e.g., vertical or horizontal) is transmitted through without refraction, and in a second opposite colinear direction that linear polarized light is transmitted through but refracted. In schlieren systems implementing the schlieren flowchart 100, the polarizing refractor is oriented so that the projected light rays (linear polarity) are transmitted through along the optical axis, without refraction, and the reflected light rays (90-degree offset linear polarity) are transmitted through, but refracted by a relatively small offset relative to the optical axis (e.g., due to the different refractive index encountered by the orthogonal linear polarization states). For example, the "small" offset is typically a distance equal to, or less than, the line spacing on the grid.

In some embodiments, the polarizing refractor is a polarizing prism, for example a Rochon prism (as in embodiments described herein), including a regular Rochon prism or a Modified Rochon prism. The Rochon prism is oriented so that the reverse-direction linear (e.g., horizontal) polarity light rays are transmitted through but refracted by a small offset angle relative to the optical axis.

In other embodiments, the polarizing refractor is another type of polarizing prism, for example a Wollaston prism or a Sénarmont prism, which transmit through the reverse-direction polarity light rays but refracted by a small offset angle (so the light rays are slightly angled relative to the optical axis), or a parallel beam splitting prism (including a fixed beam displacer or a variable beam displacer), which transmits through the reverse-direction polarity light rays but refracted by a small offset distance (so the light rays are slightly spaced from and parallel to the optical axis). The Wollaston prism refracts both beams about the optical axis. In the forward direction, the linear vertical light will be refracted down (for example), and in the reverse direction, the horizontal light will be refracted up, for example. The Sénarmont prism is functionally the same as the Rochon prism, in that one ray is unrefracted while the other is refracted (in both the forward and reverse directions). In still other embodiments, the polarizing refractor is a film or sheet of material (such as magnesium fluoride) or another optic that provides the polarizing refracting functionality described herein.

The polarizing refractor can be repositioned along the optical axis (between the grid and the density object) to adjust the sensitivity of the resulting schlieren image. Example positions are described herein, including the polarizing prism (or other polarizing refractor) positioned between the field lens and the density object. By positioning the polarizing prism after the field lens, the field lens can be positioned closer to the Ronchi ruling/grid, which allows for larger field-of-view projection (as long as the polarizing prism is larger than the clear aperture of the field lens), because the grid positioning relative to the field lens is no longer limited by the thickness of the polarizing prism.

In many embodiments, the schlieren flowchart 100 can be implemented by schlieren systems (such as those described herein) that include indexed positions for the polarizing refractor and structural elements (mechanical stops, brackets, and/or tracks, and mechanical locks/releases) that enable the polarizing refractor to translate along the optical axis between multiple fixed positions. For example, an embodiment with a motorized system includes a combination of translation and rotation stages. The Ronchi ruling and the polarizing prism are in a rotation stage to enable changing the sensitivity direction. The Ronchi ruling and polarizing prism are also on translation mounts to be able to position them relative to the field lens. In order to provide images of different focal planes (similar to a 3D image using slices), the camera can be mounted to a motorized translation stage where the specific step distances can be set, which then results in different (and precise) density object focal planes.

It will be noted that, when a polarizing beam-splitter is used in the schlieren flowchart 100 (as optionally described above), the polarizing beam-splitter is selected and oriented (in schlieren systems implementing the flowchart 100) so that it reflects the linearly polarized light rays onto the optical axis, but not the reverse-direction linearly polarized light rays. Thus, the projected light rays that the polarizing refractor "sees" are only linear (e.g., vertical) polarity state (which pass through, without being refracted) and the reflected light rays that the polarizing refractor "sees" are only 90-degree offset linear (e.g., horizontal) polarity state (which pass through, but are refracted).

Furthermore, the polarizing refraction at 120 is typically, but not necessarily, included in the schlieren flowchart 100 (and schlieren systems implementing the flowchart 100) for good sensitivity and resulting imaging (e.g., for 50-percent cutoff imaging). As such, after the light rays pass through the grid (See, e.g. block 114), but before block 116 of the flowchart 100, the light rays pass through the polarizing refractor along the optical axis, without refraction. In some embodiments, the polarizing refraction 120 is not included in the schlieren flowchart 100 (or schlieren systems implementing the flowchart 100), with the results providing less sensitivity and no information between positive and negative gradients, but still being useful for visualizing density objects. (Generally, better schlieren images are acquired with the polarizing prism operating at the 50% cutoff position (FIGS. 8a, 8c, 9a, 9c, 10a, and 10c). Bright-field imaging is generally acquired either by positioning the polarizing prism such that the conditions of FIGS. 8d, 9d, and 10d are met, or by removing the polarizing prism altogether).

The light rays may be filtered by the same grid element as in block 114 (See, e.g., block 122). Whereas the projected light rays were linear (e.g., vertical) polarity light rays filtered through the grid in the projection direction, the reflected light rays were 90-degree offset linear (e.g., horizontal) polarity light rays filtered through the grid in the opposite reflection direction. Thus, the grid image formed by the lights rays is incident to the grid element with a small offset, providing partial cutoff of the grid image and thus increased sensitivity to the density object.

Because the same grid is used as the source grid (when the light rays pass through it in the projection direction) and as the cutoff grid (when the light rays pass through it in the reflection direction), there is no need to set up and align multiple grids in order to accomplish the resulting schlieren imaging in this example set up of schlieren flowchart 100. In this way, the schlieren flowchart 100 (and schlieren systems implementing the schlieren flowchart 100) are self-aligning and compact relative to other schlieren systems and flowcharts.

The light rays are then imaged by a camera or other imaging sensor device (such as at block 124). This can be any camera suitable for use in conventional schlieren systems. For example, the camera can include global shutters so that the entire image is acquired at a single instant in time to avoid ambiguity and smearing of signals. In certain embodiments, the camera is positioned along the optical axis at the image focal plane.

Having described details of example embodiments of the example schlieren flowchart 100, details of example embodiments of schlieren systems that can be used to implement the schlieren flowchart 100 will now be described with respect to FIGS. 2-4. As such, details of the schlieren flowchart 100 described above apply to and can be included in the schlieren systems described below, and details of the schlieren system described below apply to and can be included in the schlieren method 100 described above.

Example Schlieren System 200

Figure 2:
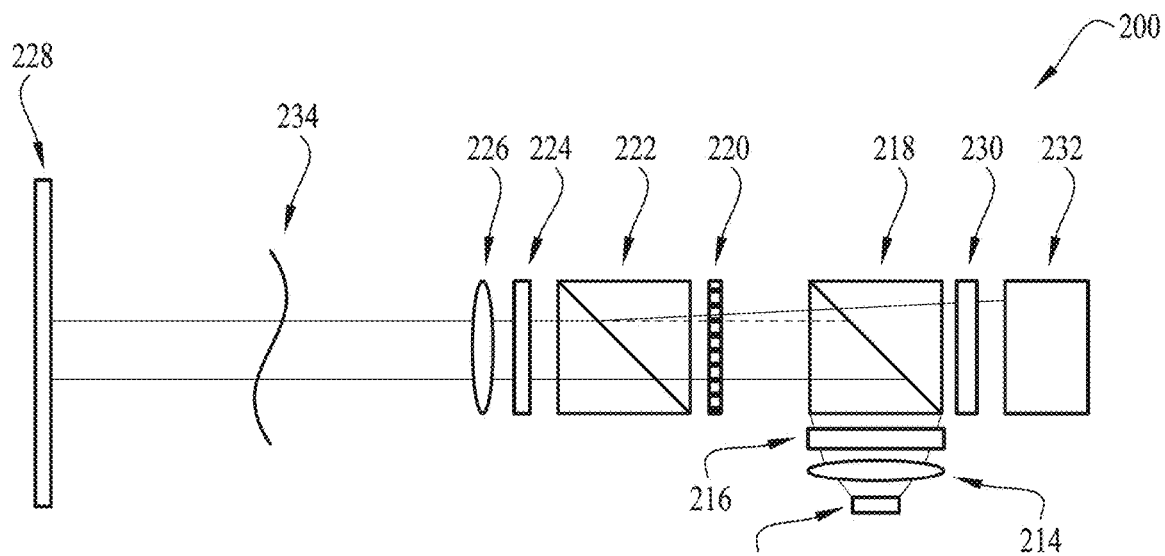
FIG. 2 is a schematic diagram of a self-aligned focusing schlieren system according to a second example embodiment and implementing the method of FIG. 1.

FIG. 2 is a schematic diagram of a self-aligned focusing schlieren system 200 according to a second example embodiment and implementing the schlieren flowchart 100 of FIG. 1. The schlieren system 200 is shown as including a light source 212, a condenser-diffuser (CD) lens 214, a first linear polarizer (LP) 216, a polarizing beam-splitter (PBS) 218, a filtering grid 220, a polarizing refractor 222, a quarter-wave plate (QWP) 224, a field lens 226, a retroreflective background (RBG) 228, a second linear polarizer (LP) 230, and a camera 232 for generating schlieren images of a density object 234. The polarizing beam-splitter 218, the filtering grid 220, the polarizing refractor 222, the quarter-wave plate 224, the field lens 226, the retroreflective background 228, the second linear polarizer 230, and the camera 232 are all positioned in that arrangement and aligned along and defining an optical axis, with the light source 212, the condenser-diffuser lens 214, and the first linear polarizer 216 orthogonal to the optical axis.

Details of these components of the schlieren system 200 are described above, with additional details and possible alternatives described below. In addition, to demonstrate variations and versatility of the schlieren system 200, the below description includes details on two test configurations: one for imaging small-scale fields-of-view and another for imaging large-scale fields-of-view. For these described variations, the system 200 may have lower transmitted light intensity but is still functional for its intended purposes.

Example Light Sources 212

Three light sources 212 are used for the images displayed in the drawings. These three light sources 212 are merely examples. The first is a white LED operating continuously, the second is a red LED operating continuously, and the third is a 640 nm Cavilux laser, operating in pulsed mode. In one configuration, the system 200 was more efficient when the polarization state of the incoming light matches the reflected polarization of the polarizing beam-splitter (PBS) 218; that is, a good configuration is that a linearly polarized light source 212 is used, where the light has the same polarization state as that reflected by the PBS 218 and coupled into the instrument/system 200, such that 100% of the light is reflected onto the optical axis and used for illumination. For unpolarized/randomly polarized light, only a fraction of the initial intensity of the light is coupled onto the optical axis and used for illumination: the remainder of the light passes through the PBS 218 and out of the system 200.

Any light source 212 can be used for this system 200 (unpolarized, randomly polarized, elliptically/circularly/linearly polarized). The amount of light reflected onto the optical axis of the system 200 will differ for each of these light sources, but the focusing schlieren system 200 operates in the same way for all. Monochromatic light sources are well-suited if chromatic aberrations become more pronounced. Generally, this is more prevalent for larger-scale systems, whereas for the smaller-scale systems, broadband white light typically works sufficiently well. Additionally, a light source 212 may be selected that falls within the limits of any anti-reflection coating used on the optics of the system 200 and within the spectral sensitivity of the camera being used.

Example Condenser Diffuser (CD) Lenses 214

The CD 214 is not restricted to a condenser lens, and any type of focusing lens may be used to accomplish the same task. Additionally, the use of a diffuser is not strictly necessary but is helpful if one desires to better diffuse the light from the light source 212.

Example Imaging Cameras 232

Any type of imaging unit (camera) 232 can be used to acquire images/videos of the flow, provided that it is sufficiently sensitive to the light source's wavelength. For the results shown in this drawing, three types of cameras 232 were used. The first was a high-resolution, low-speed, small-sensor CMOS camera (Basler, commercially available from Basler, Inc of Exton, Pa.). The second was a high-resolution, mid-speed, larger-sensors CMOS camera (commercially available from LaVision of Ypsilanti, Mich.). The third was a lower-resolution, high-speed camera (Photron SA-Z, commercially available from Photron, USA, San Diego, Calif.).

Polarizing Refractors/Prisms 222

The polarizing refractor 222 in this embodiment may be a polarizing prism (PP), specifically, a quartz Rochon prism (RP). The Rochon prism includes two right angle prisms made from quartz which are then cemented together such that their optical axes are orthogonal to one another. The ordinary ray (o-ray) passes straight through the prism, while the extraordinary ray (e-ray) is refracted, and leaves the exit face of the prism at an angle dictated by the thickness, material, and structure angle of the prism.

In addition to quartz Rochon prisms, magnesium-fluoride (MgF2), calcite, or α-BBO are also typically used as materials. Such alternative prisms can be used in this system 200 as well, but during the design process, it should be noted that for an equivalently sized prism, the deviation angle will be different than that of a quartz Rochon prism. As would be appreciated by those skilled in the art with the benefit of this disclosure, this angle should be chosen based on individual constraints for the system 200 including, but not limited to, the frequency (line pairs per millimeter) of the Ronchi ruling or other filtering grid 220.

Because polarized light travels in both directions through the polarizing prism 222 along the optical axis (on the projected path and the reflected path), the properties of how the light interacts with the prism in both directions must be known or evaluated. The light behaves differently in the forward (correct) direction versus the reverse direction for the quartz Rochon prism used in testing the system 200. A modified Rochon prism, in which having a non-birefringent piece of index-matched glass is used as the entry-half of the conventional Rochon prism, instead of using quartz (or other typical prism material) for that half of the prism should operate the same in the reverse direction as it does in the forward/correct direction.

Another polarizing prism that can be used in place of the Rochon prism is the Sénarmont prism. The entry half of the prism has the same optical axis orientation as the entry half of the Rochon prism, but the exit half of the Sénarmont prism has the optical axis rotated 90° from that of the Rochon. A modified version of this prism can also be constructed in the same manner as the modified Rochon prism.

A benefit of the Rochon and Sénarmont prisms is that one of the rays passes straight through the prism while the other ray (of orthogonal polarization) leaves the exit face at a slight angle relative to the optical axis of the system. This means that the prism can be moved relative to the Ronchi ruling or other appropriate grid element to provide different levels of sensitivity (as described herein). That is, the offset of the reflected grid imaged onto the Ronchi ruling can be adjusted, similar to how the knife-edge insertion can be adjusted in a conventional schlieren system.

A conventional parallel beam displacer has a fixed beam displacement distance. This works well when paired with a single matched Ronchi ruling. When adjustment of the sensitivity of the system is desired, an adjustable parallel beam displacer can be used. With a variable calcite beam displacer, the angle and offset between the two calcite prisms determines the offset of the two orthogonally polarized beams. Note that such a prism is not necessarily limited to the use of calcite.

It should also be noted that the system 200 can work without a polarizing prism 222. Because there is no offset induced in the reflected grid onto the cutoff grid, the system 200 without the polarizing prism 212 can act as a bright-field schlieren system. Because the grid rulings reflect directly back onto themselves, any shift due to a density object, either positive or negative, will cause the image brightness to decrease. This system 200 without the polarizing prism 212 is less sensitive and does not give information between positive or negative gradients, but can still be used to visualize density objects.

Example Linear Polarizers (LP) 216 and 230

Two linear polarizers are depicted in the system 200. Variations of the focusing schlieren system 200 can include both, one, or none of these linear polarizers, with at least the reasoning outlined in this section (amongst others). As mentioned above, any light source can be used, including unpolarized/randomly polarized, linearly polarized, or anything in between. When using the PBS 218 to direct the light onto the optical axis, the outgoing light from the light source 212 will be vertically polarized (with the PBS 218 in its default orientation, although this can also be rotated such that horizontal polarized light is reflected and vertical polarized light is passed straight through). If an unpolarized/randomly polarized light source is being used, the reflected intensity will be a fraction of the light source's intensity. If the light source 212 is vertically polarized, then the PBS 218 will reflect 100% of the intensity, with no light passing through. This is a well performing setup for the system 200, as no light is wasted. If, in this case, a vertically polarized light source 212 is being used, the linear polarizer 216 is not strictly necessary, as the polarization state is already aligned with that of the PBS 218. As mentioned before, the PBS 218 will take any other polarization state of light and only reflect the vertical polarization. However, the extinction ratio of a PBS 218 is typically less than that of a linear polarizer 216, and so using a linear polarizer before the PBS can improve the quality of the vertically-polarized outgoing beam. By improving the linearity of the polarization, a sharper image of the Ronchi ruling grid 220 will be projected on the retroreflective background 228. While the LP may not be necessary when the light source polarization matches the PBS reflection polarization, it may be useful as a means to control the intensity of light coupled into the instrument/system 200 onto the optical axis. Instead of adjusting the exposure time of the camera 232, for example, the LP 216 can instead be rotated to decrease the transmitted intensity of the light.

The linear polarizer 230 in front of the camera 232 is also optional, but can be used to improve contrast of the resulting images. This is again partially due to the high extinction ratio of linear polarizers over that of the PBS 218.

Example Quarter-Wave Plate (QWP) 224

The quarter-wave plate that is included in the example system 200 converts the outgoing/projected linear polarization to circular polarization, and converts the incoming/reflected circular polarization back to linear polarization.

This optic is not strictly needed when using some versions of a quartz Rochon prism 222 with larger refraction angles, but may be needed, for instance, when using the modified Rochon prism with the example system 200. Another alternative to the QWP optic 224 is the use of a Faraday rotator.

An alternative to using the QWP optic in the example system 200 is to use QWP film (which is also generally less expensive, and available with larger clear apertures). The QWP optic can then be removed from the system 200, and the QWP film placed either in the same position as the QWP optic or directly over the RBG material. When placed directly over the RBG material, linear (e.g., vertical) polarity light passes through the density object, is converted to circular (e.g., right) light by the QWP film, is reflected by the RBG and converted to circular (e.g., left) light, is converted to linear (e.g., horizontal) polarity light by the QWP film, passes through the density object 234, and proceeds as normal through the rest of the system 200. A potential design consideration of this approach is that the quality of QWP film is generally lower than an equivalent QWP optic. Another potential design consideration is that the QWP film adds thickness to the RBG 228, which could be problematic if the RBG is fixed to the inside of a wind tunnel test section, where the flow would then be affected more than if the RBG were by itself and the QWP positioned elsewhere.

Example Filtering Grids/Rulings 220

The system 200 includes a Ronchi ruling (RR) for the filtering grid 220. Alternatively, custom grids/rulings 220 can be formed (e.g., drawn or printed onto a slide or file (e.g., glass) and the system 200 will work well, because the system 200 is self-aligned (the projected ruling is imaged directly back onto itself when the polarizing prism is removed from the system). As such, any type of grid (ruling) can be used since the system 200 is inherently self-aligned, including prefabricated or custom film, glass, etc.

Example Beam-Splitter (PBS) 218

In the example system 200, a polarizing beam-splitting cube is used. A beam-splitting plate can also be used instead of the cube, but ghosting from the back surface of the plate may be more noticeable. A non-polarizing beam-splitter can also be used, but the transmitted intensity through the system may be diminished. To avoid projection of a double image of the grid element 218 on the RBG 228, the first linear polarizer 216 is included in the system 200. To isolate the correct reflected (incoming) beam that has been cut off by the grid element, the second linear polarizer 230 is included in the system 200.

If using a PBS 218, the orientation of the reflected linear polarization is of no consequence. That is, it can be oriented such that either vertical polarized light or horizontal polarized light is reflected onto the optical axis, as an example.

Example Background Material (RBG) 228

A background material 228 used for the example system 200 to take the images in the drawings may be the 3M SCOTCHLITE 7610 retroreflective material. It is suitable because of its high intensity return of the incident light, with consistent operation over a wide range of off-axis angles. When circular polarization is incident on the material, it converts the state from right circular polarization to left circular polarization (or vice versa) upon reflect ion. This is a property that not all retroreflective materials possess. Depending on the optics installed in the system 200, for example, as described herein, a different retroreflective material can be used. A non-retroreflective material may be used as the background (a reflective or non-reflective flat wall), but the intensity return will be significantly diminished.

Example Field Lens 226

Two different types of lenses 226 were used for the images in the drawings. For the small-scale test configuration of the system 200, a NIKON lens (commercially available from NIKON US of Melville, N.Y.) having adjustable focal length was used with the focal length was set to f=200 mm. For the large-scale test configuration of the system, a single achromat lens with a fixed focal length of f=500 mm was used. The field lens 226 can be chosen based on the size of the field-of-view/test section and the position of the density object 234 of interest.

It should be noted that lenses of any focal length can be used, depending on the application. The lens can be a typical camera lens (NIKON, CANON, etc.) or a scientific lens (achromats, aspherics, etc.). It should also be noted that it may be necessary to use a relay lens before the camera 232 in order to achieve a desired magnification of the density object 234 on the camera sensor.

Example Schlieren System 300

Figure 3:
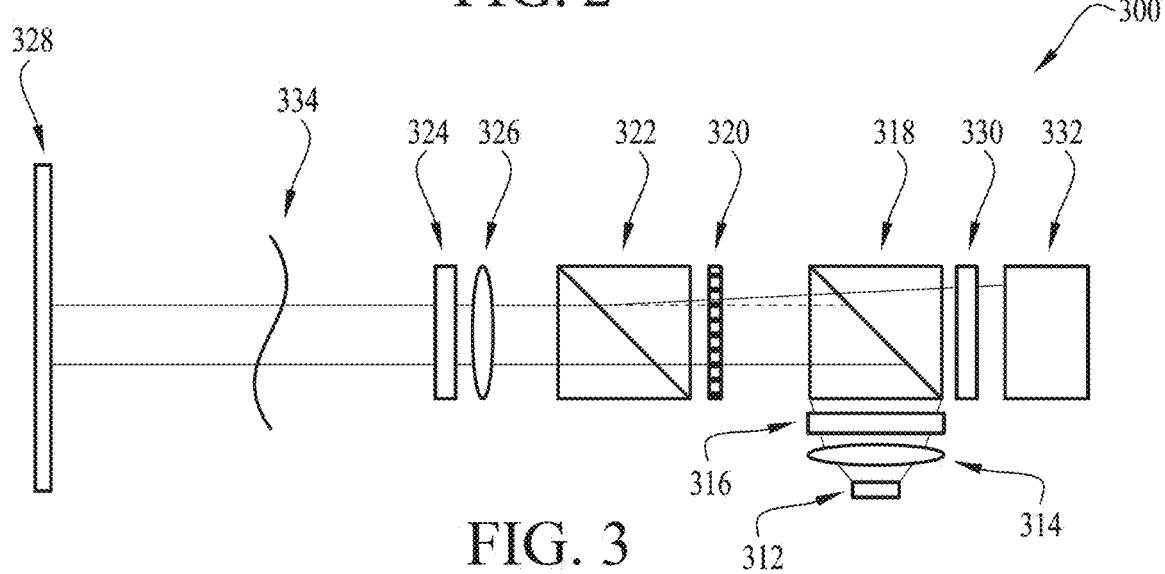
FIG. 3 is a schematic diagram of a self-aligned focusing schlieren system according to a third example embodiment and implementing the method of FIG. 1.

FIG. 3 is a schematic diagram of a self-aligned focusing schlieren system 300 according to a third example embodiment, which may be configured to implement the schlieren flowchart 100 of FIG. 1. The schlieren system 300 is similar to the schlieren system 200 described above in that it includes a light source 312, a condenser-diffuser (CD) lens 314, a first linear polarizer (LP) 316, a polarizing beam-splitter (PBS) 318, a filtering grid (RR) 320, a polarizing refractor (PP) 322, a quarter-wave plate (QWP) 324, a field lens (FL) 326, a retroreflective background (RBG) 328, a second linear polarizer (LP) 330, and a camera 332 for generating schlieren images of a density object 334. These components of the system 300 are in the same arrangement as in the system 200, except that the position of the quarter-wave plate (QWP) 324 and the field lens (FL) 326 are switched. The polarizing prism can be positioned anywhere between the RR and the density object (including between the FL and the density object, as described above) as long as the QWP is placed between the PP and RBG. A benefit of placing the QWP after the FL is that it reduces the reflections/glare from the FL optics. Modifications to the schlieren system 300 can be made as described for the other embodiments disclosed herein.

Example Schlieren System 400

Figure 4:
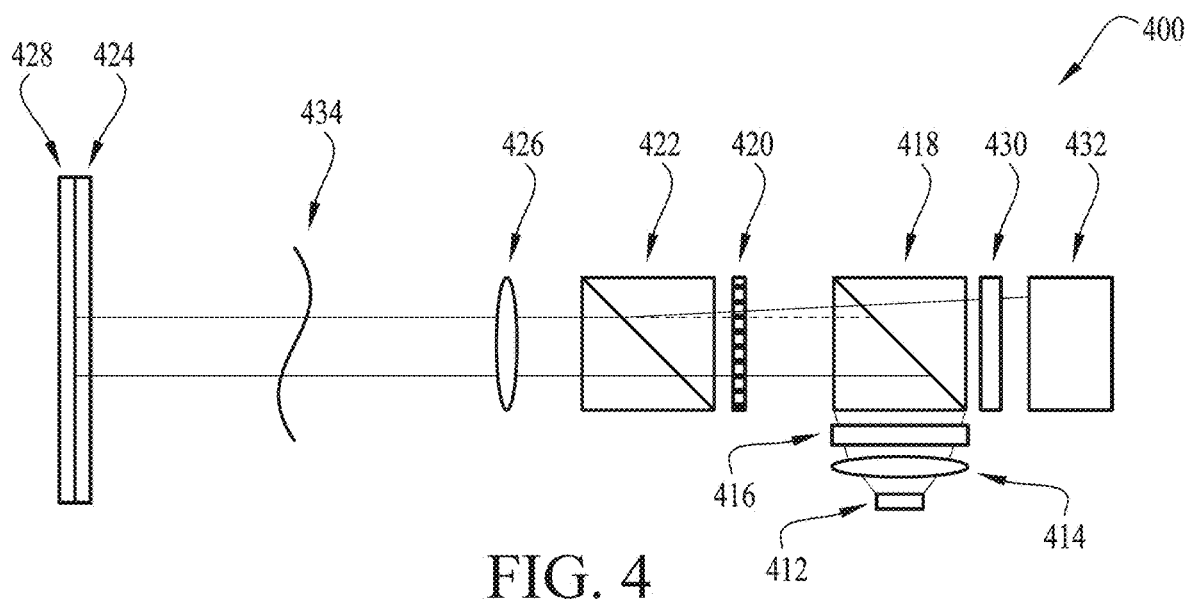
FIG. 4 is a schematic diagram of a self-aligned focusing schlieren system according to a fourth example embodiment and implementing the method of FIG. 1.

FIG. 4 is a schematic diagram of a self-aligned focusing schlieren system 400 according to a fourth example embodiment and implementing the schlieren flowchart 100 of FIG. 1. The schlieren system 400 is similar to the schlieren system 300 described above in that it includes a light source 412, a condenser-diffuser (CD) lens 414, a first linear polarizer (LP) 416, a polarizing beam-splitter (PBS) 418, a filtering grid (RR) 420, a polarizing refractor (PP) 422, a quarter-wave plate (QWP) 424, a field lens (FL) 426, a retroreflective background (RBG) 428, a second linear polarizer (LP) 430, and a camera 432 for generating schlieren images of a density object 434. These components of the system 400 are in the same arrangement as in the system 300, except that the quarter-wave plate (QWP) 424 is repositioned to be immediately adjacent (e.g., slightly spaced from, contacting, or integrated into) the incident reflecting surface of the RBG 428. The polarizing prism can be positioned anywhere between the RR and the density object (including between the FL and the density object, as described above) as long as the QWP is placed between the PP and RBG. A benefit of placing the QWP immediately in front of the RBG is that it reduces the window reflections/glare (if windows are included in the system). Modifications to the schlieren system 300 can be made as described for the other embodiments disclosed herein.

Example Placement of the Optics

Two configurations of the system 200 described above were constructed for testing the effectiveness of aspects of the schlieren flowchart 100. For this purpose, the preliminary/initial placement of the optics (e.g., the RBG 228, the Ronchi ruling (RR) grid 220, and the camera sensor 232 relative to the field lens (FL) 226 can be determined by application of the thin lens equation:

$$\frac{1}{f} = \frac{1}{d_0} + \frac{1}{d_i}$$

where f is the focal length of the lens 226, $d_0$ is the either the distance from the grid 220 to the lens 226 or the distance from the lens 226 to the density object 234, and di is either the distance from the lens 226 to the retroreflective background 228 or the distance from the lens 226 to the image of the density object. This and/or other methodologies may be used for preliminary placement only, for example because as optics are added to the system 200, these calculated distances may change, since the values are derived assuming only a thin lens/optic is present. When designing the system 200 for a wind tunnel, for instance, the background pattern 228 will often be placed on the opposite wall of the tunnel, and the model/density object 234 will usually be placed at the center of the wind tunnel. The RR grid needs to be projected to the background 228, and the model 228 needs to be imaged on the camera 232, so the size of the wind tunnel would dictate these distances. Two separate applications of the thin lens equation may be applied: one for the position of the RR grid 220 to project to the background 228, and one for the model/density object 234 imaged to the camera 232.

For a first test configuration of the system 200, a small-scale system was built to approximate the smaller wind tunnels at NASA Langley Research Center (Hampton, Va.) (e.g., 20-Inch Mach 6, 31-inch Mach 10). The distance from the field lens 226 to the background RBG 228 was d RBG=750 mm. The wind tunnel model/object 234 would be placed at the center of the test section, so to get the appropriate focus for the camera placement, d model=368 mm. An f=200 mm focal length lens 226 was being used, so the RR grid 220 and the camera 232 initial placements from the field lens 226 can be computed.

$d_{RR}=(f^{-1}-d_{R\text{-}BG}^{-1})^{-1}$ so $d_{RR}$=273 mm (10.7 in.)

$d_{cam}=(f^{-1}-d_{model}^{-1})^{-1}$ so $d_{cam}$=438 mm (17.2 in.)

For a second test configuration of the system 200, a large-scale system was constructed to approximate the size of larger wind tunnels, such as the TRANSONIC DYNAMICS tunnel, which has an approximate test section width of 18 feet (5486 mm). An f=500 mm focal length lens 226 was used for this system, and assuming the background 228 is placed on the far wall of the tunnel (d RBG=5486 mm) and the model/object 234 is located at the center of the tunnel d model=2743 mm, the RR grid 220 and camera 232 placements can again be computed as before.

$d_{RR}=(f^{-1}-d_{R\text{-}BG}^{-1})^{-1}$ so $d_{RR}$=550 mm (21.7 in.)

$d_{cam}=(f^{-1}-d_{model}^{-1})^{-1}$ so $d_{cam}$=612 mm (24 in.)

It should be noted that these calculated distances are not the final placement positions for the optics; rather they were used to roughly place the optics and to make sure there is enough room for everything in the test configurations of the example system 200.

Experiment without Polarizing Prism

The small-scale configuration of the system 200 was tested without the Rochon prism (PP) 222 installed. This configuration allows the reflected source grid projection to be exactly aligned with the Ronchi ruling (RR) 220 or other appropriate grid. When no density object is present, the light projected from the grid 220 is imaged directly back onto the grid 220, and so the maximum amount of light passes through to the camera 232, which measures a maximum intensity over the entire field. When a density object is present, the light has either a positive or negative shift along its path, and for either deflection, the intensity on the camera sensor 232 will decrease. This is different from a conventional schlieren system, where positive or negative shifts due to density gradients result in either darkening or brightening of the field. The operation of the focusing schlieren system 200 without the Rochon prism 222 functions to provide results of the same type as a bright-field schlieren system.

The self-aligned schlieren system 200 of FIG. 2, without the PP 222, was subjected to testing. A small nozzle (outer diameter DN=1.7 mm) expelled a jet of helium gas into air. The jet was traversed back and forth from the best-focus position (z=0.0 mm), where positive displacements are closer to the RBG 228 and negative displacements are closer to the field lens 226. The small-scale configuration of the system 200 without the PP 222 was operated to capture the resulting images, with the camera exposure set to 10 µs.

Figure 5A:
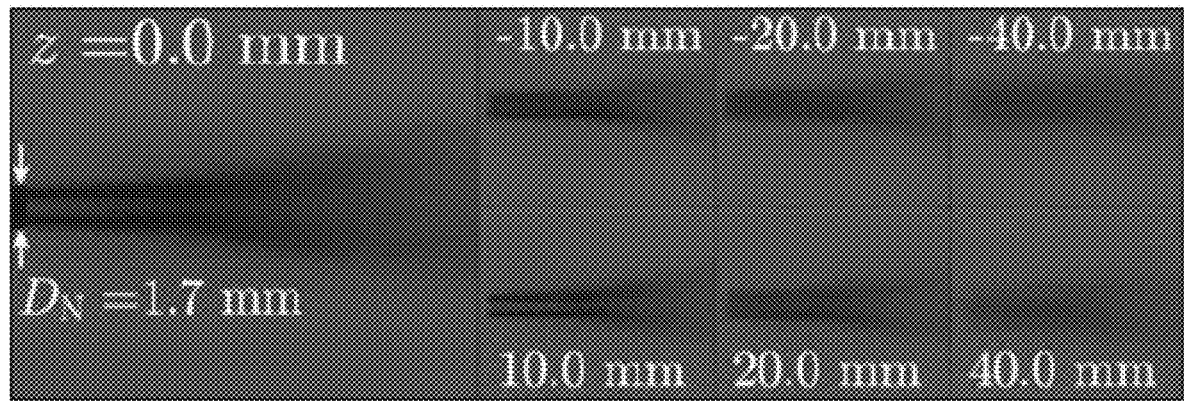
FIGS. 5a and 5b are each an ordered presentation of seven images of a helium jet at seven respective positions relative to the focal plane produced using the self-aligned focusing schlieren system of FIG. 2 except without the polarizing prism, without windows in the field-of-view in FIG. 5a and with windows in the field-of-view in FIG. 5b.
Figure 5B:
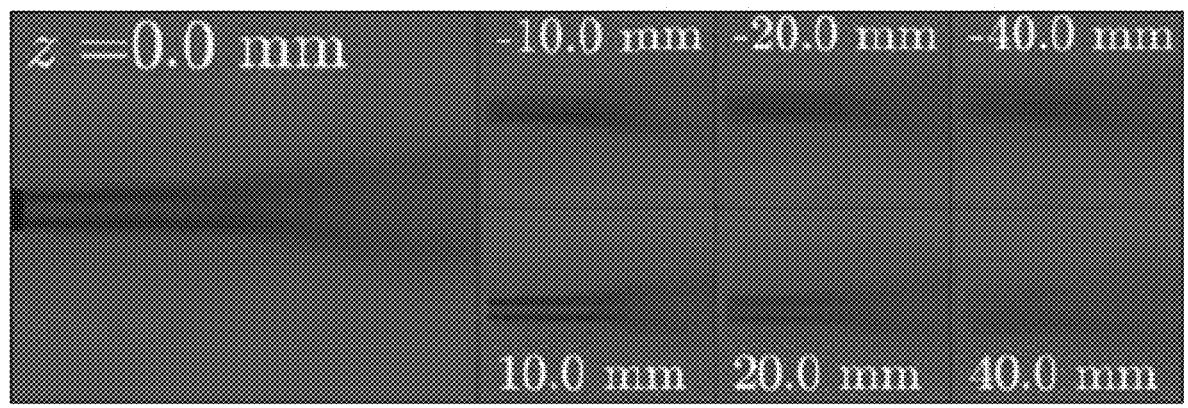

Results from the testing are shown in FIGS. 5a-b, which are each an ordered presentation of seven photographs of a helium jet at seven respective positions relative to the focal plane produced using the self-aligned schlieren system 200 of FIG. 2 except without the PP 222. FIG. 5a shows results without windows in the field-of-view, and FIG. 5b shows results for the same set up as FIG. 5a, except with acrylic windows bounding the field-of-view (between the field lens 226 and the RBG 228) and normal to the optical axis. In each of these two figures, the seven inset photos show the best-focus position (z=0.0 mm) on the left, with three negative-shifted positions (z=−10.0 mm, −20.0 mm, and −40.0 mm) across the top and with three negative-shifted positions (z=10.0 mm, 20.0 mm, and 40.0 mm) across the bottom.

In FIGS. 5a-b, the density gradients in the flow darken the image, as discussed above. No brightening of the flow field is observed, as is expected. The focusing capability is clearly demonstrated, with the jet becoming blurred and out-of-focus as the distance away from the plane of focus increases in either direction (positive or negative). While the signal magnitude and thus contrast have decreased slightly in FIG.

5b (with windows) relative to in FIG. 5a (without windows), the density object is still clearly visible and the focusing capability remains the same.

Experiment with Polarizing Prism

The small-scale configuration of the system 200 was then tested with the Rochon prism (RP) 222 installed. This allows the reflected source grid projection to be offset with respect to the Ronchi ruling (RR) grid 220, providing greater sensitivity, and acting like a conventional schlieren knife-edge cutoff. This setup used in this testing was identical to that tested above, except here the Rochon polarizing prism PP 222 is included.

Figure 6A:
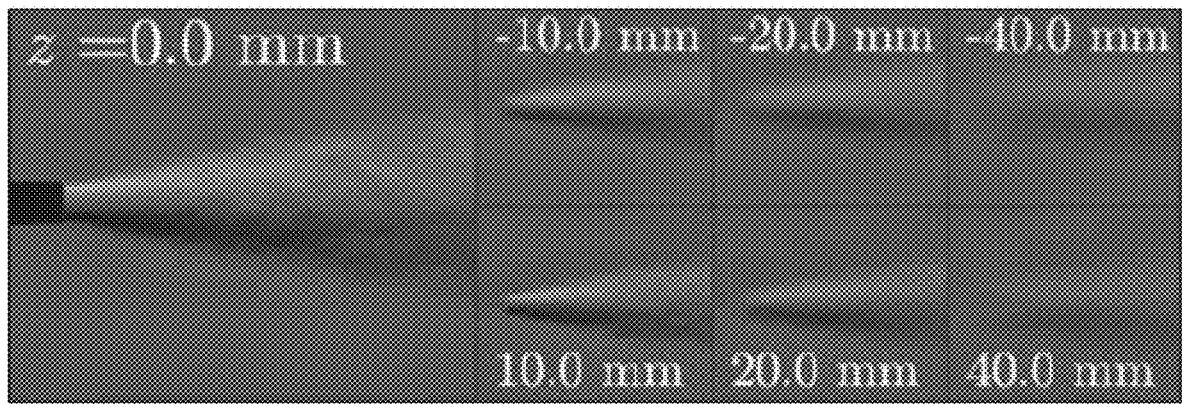
FIGS. 6a and 6b are each an ordered presentation of seven images of a helium jet at seven respective positions relative to the focal plane produced using the self-aligned focusing schlieren system of FIG. 2 with the polarizing prism, without windows in the field-of-view in FIG. 6a and with windows in the field-of-view in FIG. 6b.
Figure 6B:
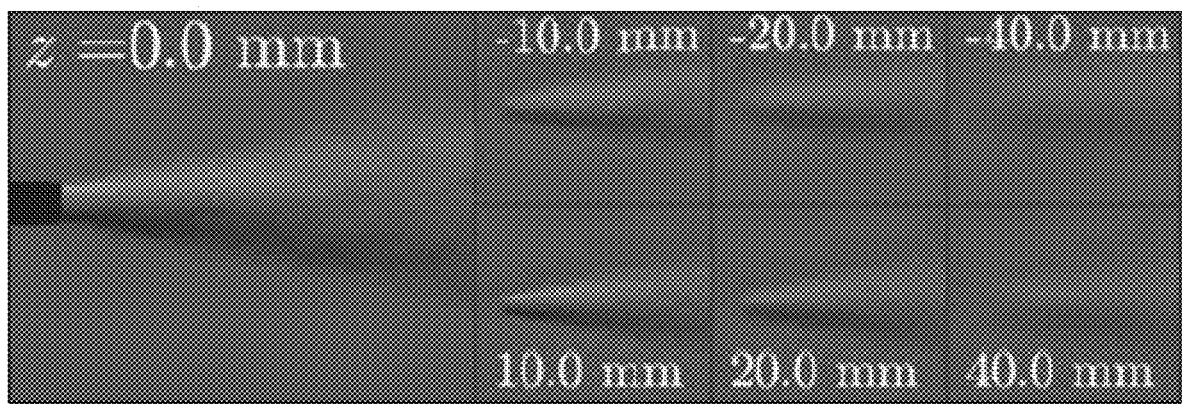

Results from the testing are shown in FIGS. 6a-b, which are each an ordered presentation of seven photographs of a helium jet at seven respective positions relative to the focal plane produced using the self-aligned schlieren system 200 of FIG. 2 with the RP 222. FIG. 6a shows results without windows in the field-of-view, and FIG. 6b shows results for the same set up as FIG. 6a, except with acrylic windows bounding the field-of-view (between the field lens 226 and the RBG 228) and normal to the optical axis. In each of these two figures, the seven inset photos show the best-focus position (z=0.0 mm) on the left, with three negative-shifted positions (z=−10.0 mm, −20.0 mm, and −40.0 mm) across the top and with three negative-shifted positions (z=10.0 mm, 20.0 mm, and 40.0 mm) across the bottom.

The images in FIGS. 6a-b again show a small diameter helium jet flow, with the helium tank gage pressure now increased by a factor of two from the previous test. In these figures, a brightening of the top of the jet and a darkening of the bottom of the jet is visible, indicating that the system 200 is operating in the conventional schlieren mode. However, the focusing capability of the system 200 is again made clear with the images acquired off of the plane of focus in both the positive and negative directions. With the acrylic windows added normal to the optical axis, FIG. 6b shows that the signal magnitude and contrast have again decreased slightly, but the quality of the images is still good and the focusing capability remains.

Example Sensitivity Adjustability by Rochon Prism Repositioning

To demonstrate the sensitivity adjustability of the example system 200, the Rochon prism (RP) 222 was moved through a sweep, translationally along the optical axis, to different locations relative to the Ronchi ruling (RR) 220. This is effectively a test of the cutoff percentage of the system 200.

Figure 7:
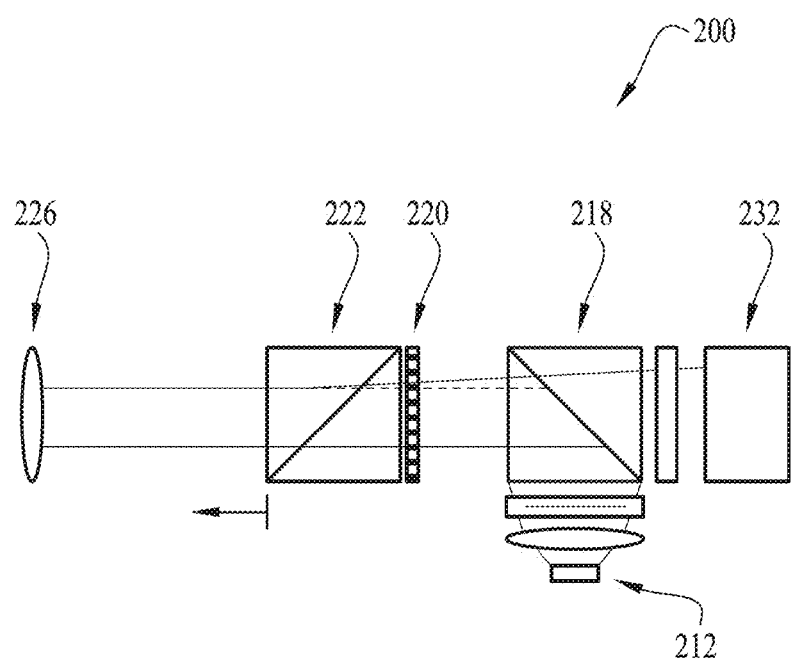
FIG. 7 is a schematic diagram of a portion of the self-aligned focusing schlieren system of FIG. 2, showing the polarizing prism adjusted through positions along the optical axis to provide sensitivity adjustments.

FIG. 7 shows relevant portions of the system 200 of FIG. 2, including the light source 212, the PBS 218, the RR 220, the RP 222, the field lens 226, and the camera 232, and showing a relative shifting positional value $Z_{RP}$ between the RP 222 and RR 220. When $Z_{RP}$=0 cm, the RP 222 was pushed up against RR 220 (as close as possible for these optics). The RP 222 was then moved from this position to $Z_{RP}$=17 cm, in incremental steps of 1 cm. As the offset between the reflected source grid and the Ronchi ruling 220 changed, the intensity of the image increased and decreased in a wave-like manner. This offset of the reflected grid on the Ronchi ruling 220 essentially changed the operation of the system 200 from a bright-field schlieren system, to an X % cutoff schlieren system, to a dark-field schlieren system, and so on.

FIGS. 8a-d, 9a-d, and 10a-d show test results of test knife-edge sensitivity adjustments at four intermediate positions of the RP 222 to demonstrate the effects of the sweep. These four intermediate positions were found using the histogram of the images (a plot of number of pixels vs. intensity) without a density object present. As an image darkens, the bell curve shifts to the left, and as an image lightens, the bell curve shifts to the right. The first position (FIGS. 8a, 9a, and 10a, $Z_{RP}$=0.25 cm) and the third position (FIGS. 8c, 9c, and 10c, $Z_{RP}$=5.75 cm) were selected when the peak of the histogram was halfway between the minimum and maximum intensity values (the 50-percent cutoff). The second position (FIGS. 8b, 9b, and 10b, $Z_{RP}$=3.00 cm) was selected for when the histogram intensities were minimized (dark-field), while the fourth position (FIGS. 8d, 9d, and 10d, $Z_{RP}$=8.50 cm) was selected for when the histogram intensities were maximized (bright-field).

Each of FIGS. 8a-d, FIGS. 9a-d, and FIGS. 10a-d corresponds to one of the four positions. Each of FIGS. 8a-d includes a schematic grid of the Ronchi ruling (cross-hatched), projected grid (hatched), and reflected source grid (black). The grid lines in the schematic grids of FIGS. 8a-d include a horizontal offset for visual clarity. Each of FIGS. 9a-d includes an intensity versus grid shift plot corresponding to FIGS. 8a-d, respectively. And each of FIGS. 10a-d is a photographic image (taken using the system 200) of the characteristic flow field (a heat gun jet flowing vertically) corresponding to FIGS. 8a-d, respectively.

Figure 8A:
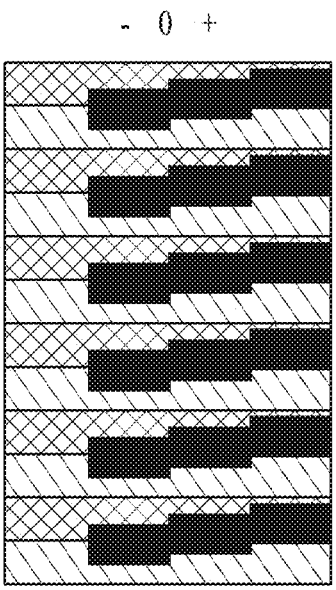
FIGS. 8a, 8b, 8c, and 8d are each a grid schematic showing sensitivity adjustments from the repositioning of the self-aligned focusing schlieren system of FIG. 7, with a 50 percent cutoff percentage in FIG. 8a, with a 100 percent cutoff percentage in FIG. 8b, with a 50 percent cutoff percentage in FIG. 8c, and with a 0 percent cutoff percentage in FIG. 8d.
Figure 8C:
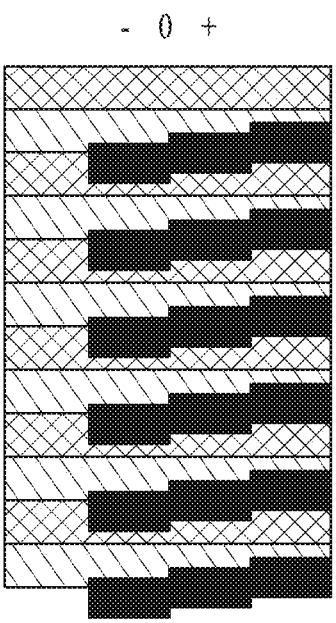

In FIG. 8a, the system 200 is configured to operate in a conventional schlieren mode, where the PP 222 is placed such that the reflected grid (black) is 50% cut off by the RR 220 (cross-hatched). With a positive direction shift, the intensity decreases, and with a negative direction shift, the intensity increases. The data in FIG. 8c is very similar, except in this case the reflected grid is shifted down by a half wavelength of the RR 220. The mean intensity without a density object is the same as that of FIG. 8a, but with a positive shift the intensity now increases, and with a negative shift the intensity now decreases. While the corresponding jet images of FIGS. 10a and 10c look very similar, the effect can most clearly be seen just above the heat gun nozzle (left side of the nozzle); in FIG. 10a this region is relatively dark, whereas in FIG. 10c this region is relatively light.

Figure 8B:
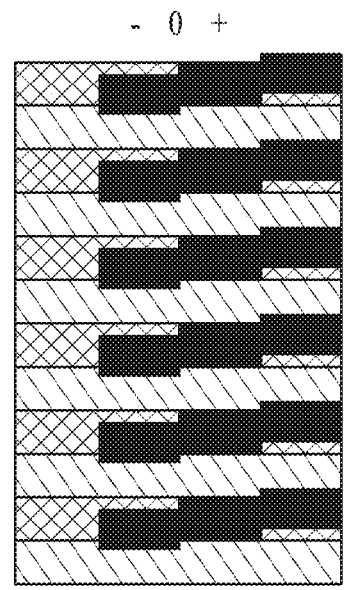
Figure 8D:
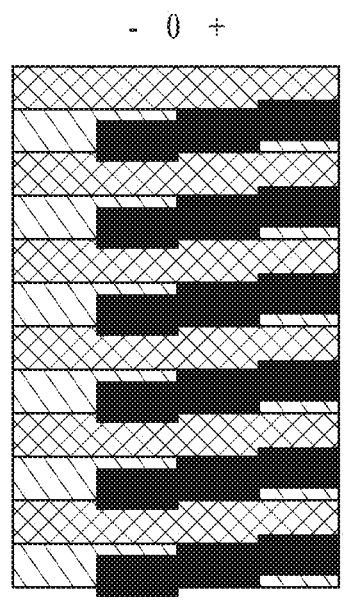
Figure 9A:
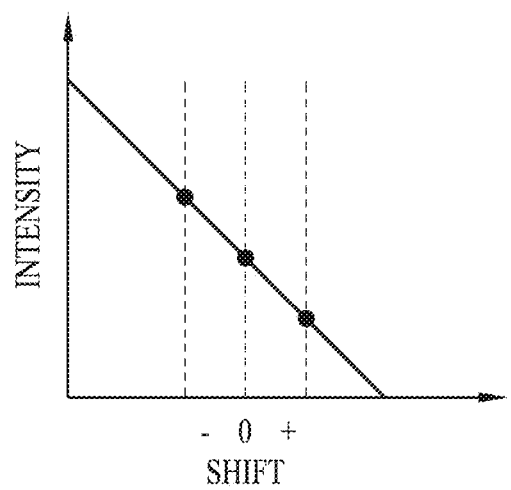
FIGS. 9a, 9b, 9c, and 9d are each an intensity vs. shift plot corresponding to FIGS. 8a, 8b, 8c, and 8d, respectively.
Figure 9B:
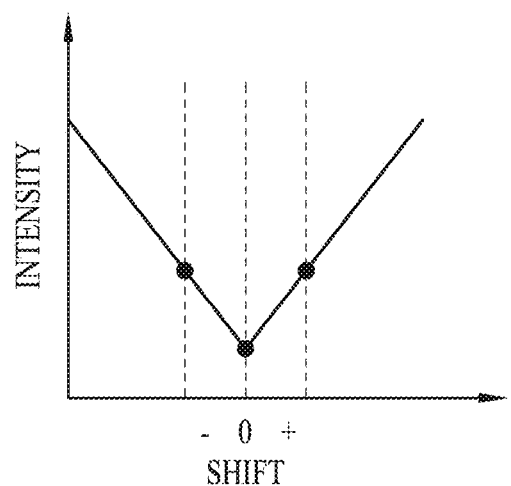
Figure 9C:
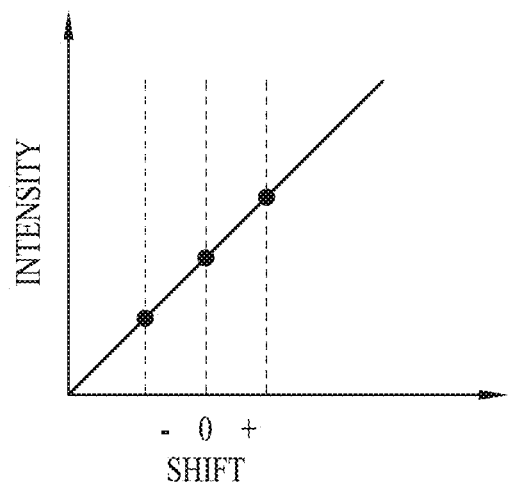
Figure 9D:
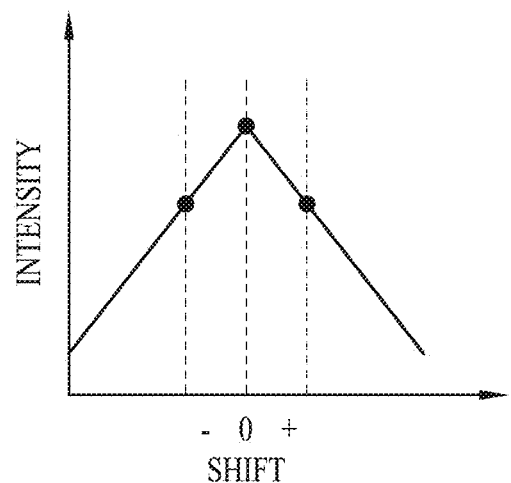
Figure 10A:
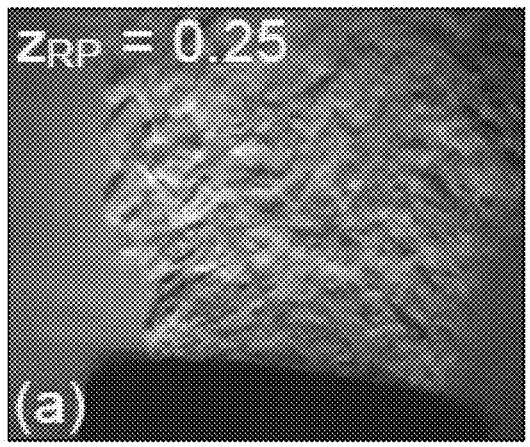
FIGS. 10a, 10b, 10c, and 10d are each an image of a heat gun exhaust corresponding to FIGS. 8a, 8b, 8c, and 8d, respectively.
Figure 10B:
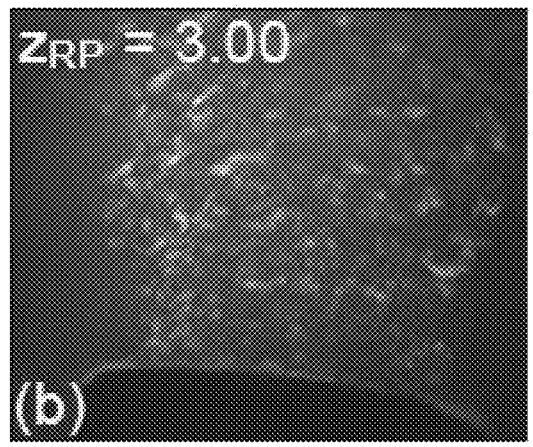
Figure 10C:
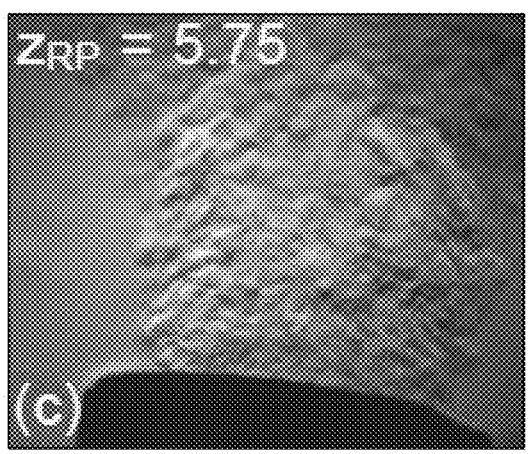
Figure 10D:
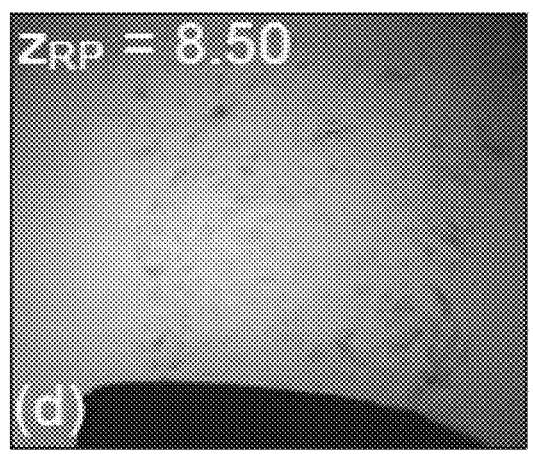

When the histogram intensities were minimized, a dark-field schlieren system 200 is obtained, as shown in FIGS. 8b, 9b, and 10b. Here, the reflected source grid is coincident on the opaque grid lines of the RR 220. This means that a minimum amount of light is passed through (ideally zero light). With a positive or negative shift due to the presence of a density object, the intensity measured on the camera 232 can only increase, which is why the plume features appear brighter. The zero-shift case is the minimum-intensity position on the intensity plot, which shows that any shift increases the intensity. A similar but opposite effect is seen in FIGS. 8d, 9d, and 10d, where the system 200 now behaves as a bright-field schlieren system. The reflected source grid passes straight through the transparent portion of the RR 220, and the maximum brightness in the image of FIG. 10d is achieved when no density object is present. This is also shown in the intensity plot of FIG. 8d, where any positive or negative shift from a density object will reduce the intensity imaged on the camera 232.

While the claimed invention has been shown and described in example forms, it will be apparent to those skilled in the art that many modifications, additions, and deletions can be made therein without departing from the spirit and scope of the invention as defined by the following claims.

What is claimed is:

1. A method of schlieren imaging a density object, comprising:
    projecting light rays with a first linear polarity along an optical axis in a projected direction;
    filtering the first linear polarity light rays through a grid a first time in the projected direction;
    passing the filtered light rays through the density object a first time in the projected direction;
    reflecting the filtered light rays back along the optical axis in a reflected direction opposite the projected direction;
    passing the reflected light rays through the density object a second time in the reflected direction;
    converting the reflected light rays from the first linear polarity to a second linear polarity that is offset by 90 degrees from the first linear polarity;
    filtering the 90-degree offset liner polarity light rays through the grid a second time in the reflected direction; and
    imaging the twice-filtered light rays,
wherein when the light rays with the first linear polarity are filtered through the grid the first time, the grid functions as a source grid, wherein when the light rays with the second 90-degree offset linear polarity are filtered through the grid the second time, the grid functions as a cutoff grid, and wherein filtering the light rays through the same grid twice results in self-alignment without any multi-grid alignment step.

2. The schlieren imaging method of claim 1, wherein projecting light rays with the first linear polarity includes projecting light rays from a light source and linearly polarizing the light rays with the first linearly polarity.

3. The schlieren imaging method of claim 2, wherein the light source projects the light rays transverse to the optical axis, and further comprising projecting the light rays from the light source through a beam splitter on the optical axis that redirects the light rays onto the optical axis.

4. The schlieren imaging method of claim 1, wherein filtering the first linear polarity light rays through the grid, and filtering the second 90-degree offset linear polarity light rays through the grid, each include filtering the respective light rays through a Ronchi ruling grid.

5. The schlieren imaging method of claim 1, wherein reflecting the filtered light rays includes reflecting the filtered light rays off a retroreflective background.

6. The schlieren imaging method of claim 1, wherein converting the reflected light rays from the first linear polarity to the second 90-degree offset linear polarity includes:
    converting the light rays from the first linear polarity to a first circular polarity;
    converting the light rays from the first circular polarity to a second circular polarity with a reverse angular direction from the first circular polarity; and
    converting the light rays from the second circular polarity to the second 90-degree offset linear polarity.

7. The schlieren imaging method of claim 6, wherein the light rays are converted from the first linear polarity to the first circular polarity, and from the second reverse-direction circular polarity to the second 90-degree offset linear polarity, by passing the light rays through a quarter-wave plate optic or film on the optical axis.

8. The schlieren imaging method of claim 7, wherein the light rays are converted from the first linear polarity to the first circular polarity after being filtered by the grid the first time and before being reflected back, and the light rays are converted from the second reverse-direction circular polarity to the second 90-degree offset linear polarity after being reflected back and before being filtered by the grid the second time.

9. The schlieren imaging method of claim 6, wherein the light rays are converted from the first circular polarity to the second reverse-direction circular polarity by reflecting the filtered light rays including reflecting the filtered light rays off a retroreflective background.

10. The schlieren imaging method of claim 1, further comprising refracting the reflected light rays by an offset amount after converting the reflected light rays to the second 90-degree offset linear polarity and before filtering the 90-degree offset liner polarity light rays through the grid the second time.

11. The schlieren imaging method of claim 10, wherein the reflected light rays are refracted by the offset amount by a polarizing prism on the optical axis.

12. A system for schlieren imaging a density object, comprising:
    a light source assembly that projects light rays having a first linear polarity;
    a grid that filters the light rays and is positioned on an optical axis;
    a background that reflects the light rays and is positioned on the optical axis;
    one or more optical elements that convert the light rays from the first linear polarity to a second linear polarity that is offset by 90 degrees from the first linear polarity, wherein the one or more linear polarity 90-degree offsetting optical elements are positioned on the optical axis between the grid and the background; and
    a camera that images the light rays and is positioned on the optical axis,
wherein in use the light rays are projected along the optical axis in a projected direction, filtered through the grid a first time, passed through the density object a first time, reflected off the background back along the optical axis in a reflected direction opposite the projected direction, passed through the density object a second time, filtered through the grid a second time, and incident on the camera,
wherein in use the one or more linear polarity 90-degree offsetting optical elements convert the light rays from the first linear polarity to the second 90-degree offset linear polarity after the light rays are filtered through the grid the first time and before the light rays are filtered through the grid the second time so that the grid functions as a source grid and as a cutoff grid.

13. The schlieren imaging system of claim 12, wherein the light source projects the light rays transverse to the optical axis, and further comprising a beam splitter that is positioned on the optical axis and that redirects the light rays onto the optical axis.

14. The schlieren imaging system of claim 12, wherein the grid is a Ronchi ruling grid.

15. The schlieren imaging system of claim 12, wherein the background is a retroreflective background.

16. The schlieren imaging system of claim 12, wherein the one or more linear polarity 90-degree offsetting optical elements include a quarter-wave plate optic or film that is positioned between the grid and the background, that converts the light rays from the first linear polarity to the first circular polarity in the projected direction, and that converts the light rays from the second circular polarity to the second 90-degree offset linear polarity in the reflected direction.

17. The schlieren imaging system of claim 16, wherein the one or more linear polarity 90-degree offsetting optical elements further include a retroreflective surface of the background that converts the light rays from the first circular polarity to the second reverse-direction circular polarity.

18. The schlieren imaging system of claim 12, further comprising a polarizing refractor that is positioned on the optical axis between the grid and the one or more linear polarity 90-degree offsetting optical elements, that transmits the linear polarity light rays through without refraction in the projected direction, and that that transmits the 90-degree offset linear polarity light rays through with an offset amount of refraction in the projected direction.

19. The schlieren imaging system of claim 18, wherein the polarizing refractor is a polarizing prism or a film or sheet of magnesium fluoride.

20. The schlieren imaging system of claim 18, wherein the polarizing refractor is a Rochon prism, a Wollaston prism, a Sénarmont prism, or a parallel beam-splitting prism.

* * * * *